US012732542B2

(12) United States Patent
Brinkhoff et al.

(10) Patent No.: US 12,732,542 B2
(45) Date of Patent: Sep. 8, 2026

(54) UNIFIED DEVICE MANAGEMENT ENGINE IN A DEVICE MANAGEMENT SYSTEM

(71) Applicant: Microsoft Technology Licensing, LLC, Redmond, WA (US)

(72) Inventors: Christiaan Brinkhoff, Woodinville, WA (US); Peter John Richards, Snoqualmie, WA (US); Jinhua Fei, Bellevue, WA (US); Andrew Ho Yin Miyasato, Kirkland, WA (US); Zachary Cole Willson, Redmond, WA (US); Amar Dinesh Zavery, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/611,563

(22) Filed: Mar. 20, 2024

(65) Prior Publication Data

US 2025/0301020 A1 Sep. 25, 2025

(51) Int. Cl.
*H04L 29/06* (2006.01)
*H04L 9/40* (2022.01)

(52) U.S. Cl.
CPC .................................... *H04L 63/20* (2013.01)

(58) Field of Classification Search
CPC ..... H04L 63/20; H04L 63/10; H04L 63/1433; H04L 63/102; H04L 63/0263; H04L 63/107
See application file for complete search history.

(56) References Cited

U.S. PATENT DOCUMENTS 8,200,818 B2 6/2012 Freund
9,898,606 B1 2/2018 Xue
(Continued)

FOREIGN PATENT DOCUMENTS

CA 1-143-660 A2 * 10/2021
CN 106647560 A 5/2017
(Continued)

OTHER PUBLICATIONS

International Search Report and Written Opinion received for PCT Application No. PCT/US2025/011294, Apr. 2, 2025, 14 pages.
(Continued)

*Primary Examiner* — Longbit Chai
(74) *Attorney, Agent, or Firm* — Shook, Hardy & Bacon L.L.P.

(57) ABSTRACT

Methods, systems, and computer storage media for providing unified device management using a unified device management engine of a device management system are described. Device management refers to administering, controlling, and maintaining various types of computing devices. The unified device management engine provides a unified policy object that supports unified management of a remote client and a local client using a unified policy. A unified policy object for a remote client and a local client is configured. The unified policy object is a combined management configuration that enables enforcement of a unified policy on both the remote client and the local client. The unified policy is communicated to the remote client. Unified device management data associated with the unified policy, the remote client, and the local client is generated. The unified device management data is communicated to cause display of the unified device management data on a device management interface.

20 Claims, 11 Drawing Sheets

(56) References Cited

U.S. PATENT DOCUMENTS

| | | | |
|---|---|---|---|
| 10,757,091 | B2 | 8/2020 | Kannan |
| 11,388,199 | B2 | 7/2022 | Maynard |
| 11,888,902 | B2 | 1/2024 | Ravi |
| 2016/0087993 | A1 | 3/2016 | Jindal |
| 2023/0188423 | A1 | 6/2023 | Ryman |

FOREIGN PATENT DOCUMENTS

| | | | |
|---|---|---|---|
| EP | 1143660 | A2 | 10/2001 |
| WO | 2023191928 | A1 | 10/2023 |

OTHER PUBLICATIONS

"Using PowerShell", Retrieved From: https://subscription.packtpub.com/book/cloud-and-networking/9781804618592/2/ch02lvl1sec17/using-powershell, 2024, 5 Pages.

Reitan et al., "How to configure the Intune Company Portal apps, Company Portal website, and Intune app", Retrieved From: https://learn.microsoft.com/en-us/mem/intune/apps/company-portal-app, Jun. 6, 2023, 23 Pages.

* cited by examiner

UNIFIED DEVICE MANAGEMENT ENGINE IN A DEVICE MANAGEMENT SYSTEM

BACKGROUND

Users rely on computing environments with applications and services to accomplish computing tasks. Distributed computing systems host and support different types of applications and services in managed computing environments. In particular, computing environments can implement a device management system that provides device management functionality for devices in the computing environments. For example, device management can include monitoring and securing devices within a computing environment network. Device management provides administrators with centralized control over devices, allowing them to enforce policies, deploy applications, configure settings, and ensure compliance with security requirements.

SUMMARY

Various aspects of the technology described herein are generally directed to systems, methods, and computer storage media for, among other things, providing unified device management using a unified device management engine of a device management system. Device management generally refers to administering, controlling, and maintaining various types of computing devices in a computing environment. The unified device management engine provides a unified policy object that supports unified management of a remote client and a local client using a unified policy. The unified policy object is a combined management configuration that enables enforcement of the unified policy on both the remote client and the local client. In this way, the unified policy object consolidates policy configuration, management, and enforcement for remote clients and local clients.

The unified policy refers to a single set of rules or configurations that are enforced on a remote client or a local client. The unified policy can be associated with resource allocation, access controls, compliance, and other aspects of client usage. The unified policy is enforceable across related devices (i.e., remote clients and local clients). The unified policy can be enforced temporarily on a local client that is connected to a remote client via a remote session. In some examples, the remote client is a managed virtual instance of a desktop in the cloud and the local client is either a managed device with a local device management system agent or a BYOD (Bring Your Own Device) device with an unmanaged local operating system.

A device management client—associated with the device management system and the unified management engine—can be used to configure and manage the unified policy object and the unified policy. Using the device management client, an administrator can configure the unified policy object and unified policy—via the device management client—with the unified management engine. The device management client can access unified device management data associated with the unified policy object, the unified policy, remote clients, and local clients. The unified device management data refers to a structured set of information or metadata that consolidates aspects of policy configuration, management, and enforcement for combined management of remote clients and local clients. The device management client can access the unified device management data via an interface of the device management client.

Conventionally, device management systems are not configured with a comprehensive computing logic and infrastructure to efficiently provide combined device management of remote clients and local clients. For example, customers that use thin clients as endpoints to connect to a virtualization solution use a separate standalone device management solution that is not integrated into the virtualization solution. Computing resources are not efficiently utilized as both the virtualization solution and device management solution have to be configured and operated separately. Moreover, some confusion can arise on the device management solution when remote clients and local clients are managed separately. For example, with virtualization solutions that boot the local client directly into a remote client, the local client—when running the operating system locally—can be confused with a direct boot to the remote client, especially in scenarios where both the remote client and the local client have the same operating system (OS). In other words, an administrator may not be able to tell the difference between the local client running on the local OS and the local client connected to the remote client. As such, an integrated management solution is necessary to ensure improved performance (e.g., operations and interfaces) for computing functionality and user satisfaction in combined remote client and local client device management.

A technical solution—to the limitations of conventional device management systems—can include providing unified device management resources via a unified management engine that supports device management in a device management system. Unified device management resources can include operations for configuring a unified policy object and a unified policy that can be enforced in combination at remote clients and local clients. For example, the unified policy can be enforced on a local client that is in a remote session with a remote client. Further, a device management client can manage unified device management functionality via an interface that supports accessing unified device management data. As such, the device management system can be improved based on unified device management resources that operate to generate and employ a unified policy object-designed to improve the way a device management system manages devices; and the unified device management resources further operate to provide efficient combined management of remote clients and local clients a computing environment.

In operation, a unified policy object for a remote client and a local client is configured. The unified policy object is a combined management configuration that enables enforcement of a unified policy on both the remote client and the local client. The unified policy is communicated to the remote client. Unified device management data associated with the unified policy, the remote client, and the local client is generated. The unified device management data is communicated to cause display of the unified device management data on a device management interface.

In a second embodiment, a request for unified device management data associated with a unified policy, a remote client, and a local client is communicated. The unified policy is associated with a unified policy object that is a combined management configuration that enables enforcement of the unified policy on the remote client and the local client. Based on communicating the request, the unified device management data is received. The unified device management data is caused to be displayed.

In a third embodiment, a unified policy is received at a remote client associated with a local client. The unified policy is associated with a unified policy object that is a combined management configuration that enables enforcement of the unified policy on the remote client and the local client. A remote connection with the local client is initialized. The unified policy is communicated to the local client to cause the local client to apply the unified policy.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Overview

Figure 1A:
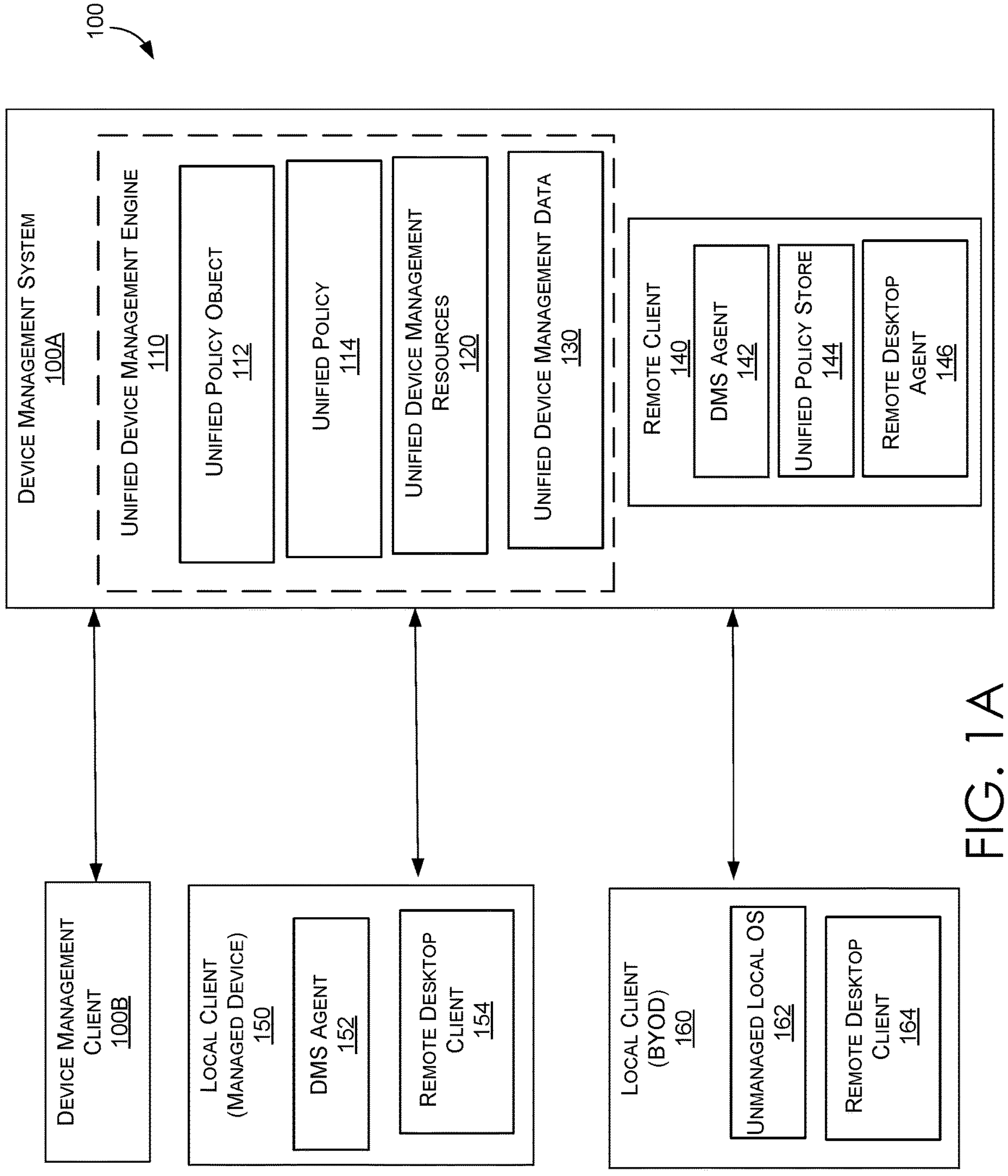
FIG. 1A is a block diagram of an exemplary device management system including a unified device management engine, in accordance with aspects of the technology described herein.

A device management system provides device management functionality for different types of devices in computing environments. The device management system ensures manageability, security and compliance of devices within a computing network (e.g., an organizational network), particularly in environments where Bring Your Own Device (BYOD) or corporate-owned, personally enabled (COPE) policies are in place. Device management can include monitoring and securing managed devices and unmanaged devices within a computing environment network. Device management provides administrators with centralized control over devices, allowing them to enforce policies, deploy applications, configure settings, and ensure compliance with security requirements.

Conventionally, device management systems are not configured with a comprehensive computing logic and infrastructure to efficiently provide combined device management of remote clients and local clients. For example, customers that use thin client endpoints to connect to a virtualization solution use a separate standalone device management solution that is not integrated into the virtualization solution. Computing resources are not efficiently utilized as both the virtualization solution and device management solution have to be configured and operated separately. Moreover, some confusion can arise on the device management solution when remote clients and local clients are managed separately. For example, with virtualization solutions that boot the local client directly into a remote client, the local client operating system can be confused for the remote client, especially in scenarios where both the remote client and the local client have the same operation system (OS).

Another limitation with existing device management can be associated with how policy object attributes are assigned. Policy object attributes (e.g., Wi-Fi, apps, settings, updates) assigned to a remote client and a local client can have many duplicates, especially because the local client connects to the remote client to operate—and the local client does not need its own policy object attributes. Moreover, managing physical devices can basically double the workload in some instances because each physical device (e.g., local device) has a corresponding virtual device (e.g., remote client) which are managed separately in the device management solution. As such, a comprehensive device management system—with an alternative basis for performing device management operations—can improve computing operations and interfaces in device management systems.

Embodiments of the present technical solution are directed to systems, methods, and computer storage media for, among other things, providing unified device management using a unified device management engine of a device management system. Device management generally refers to administering, controlling, and maintaining various types of computing devices in a computing environment. The unified device management engine provides a unified policy object that supports unified management of a remote client and a local client using a unified policy. The unified policy object is a combined management configuration that enables enforcement of the unified policy on both the remote client and the local client. In this way, the unified policy object consolidates policy configuration, management, and enforcement for remote clients and local clients. Unified device management is provided using the unified management engine that is operationally integrated into the device management system. The device management system supports a unified device management framework of computing components associated with generating a unified policy object associated with a unified policy, and enforcing the unified policy on a remote client and a local client in a remote session. Unified device management data associated with unified device management functionality is accessible via a device management client.

At a high level, a device management system (e.g., MICROSOFT INTUNE) includes a unified management engine that supports managing a local client and a remote client using a unified policy object. The unified management engine operates with the device management system that is equipped with unified management functionality. The unified policy object is used to deploy a unified policy that is utilized to manage both the device management system experience (e.g., a mobile device manager) and user experience (e.g., a virtual desktop). The unified policy can be used to temporarily manage a local client that is in a remote session with a remote client.

The remote client and the local client can be configured in a primary-secondary relationship. In the primary-secondary relationship, the remote client operates as a primary device associated with a unified device management state and the local client operates as a secondary device associated with the unified device management state based on the primary device. The unified device management state can be generated as part of the unified device management data. The unified policy can be enforced or applied on the local client for the duration of the remote session. As such, when the local client is connected to the remote client, policy, security and compliance features from the device management system can be applied on the local client without requiring full enrollment (e.g., complete registration and configuration) of the local client to the device management system. In this way, the local client is managed without an independent management policy object in the device management system.

It is contemplated that a device management system (DMS) agent on the local client can manage conflict resolution in the case of multi-resource access via the local client; for example, the local client accessing multiple remote clients. Conflict resolution for different policy attributes on a local client can be managed based on the unified policy conflict rules defined via the device management system. The unified policy conflict rules can define policy precedence, hierarchy, merge or override rules. For example, conflicts can be prioritized based on precedence levels assigned according to factors like user roles, device types, or organizational units, ensuring that higher-priority policies take precedence over lower-priority ones in case of conflicts. Hierarchy and inheritance principles enable more specific policies to override more general ones, with settings inherited from parent objects and overridden only as needed. Merge or override rules dictate how conflicting policies are handled, either by merging their settings or prioritizing one policy over another based on predefined criteria.

When the remote session is terminated, the local client is no longer managed using the unified policy. This can include restoring the local client back to its original state including removing the applied policy settings from the device, restoring it to its previous state or default configuration. This process can involve reversing the changes made by applying the policy, such as configuration settings, security restrictions, or access controls, to return the device to its original settings or to remove the policy entirely. Managing the local client in this way after the remote session is terminated is applicable and beneficial to several scenarios for local clients. They include, but are not limited to: BYOD scenarios, where users do not want to grant full control of their personal devices; third-party cloud support partner scenarios, where support partners connect to different customer-owned remote clients that have different policy configurations associated with each customer; and shared local client scenarios, where multiple users, operating in shifts, connect to their own personal remote clients via the same local client and have the right level of security in their respective roles.

From an administrator perspective, an administrator configures—via a device management client of the device management system-a unified policy object for remote clients and local clients. Configuring the unified policy object can include generating a unified policy. The unified policy can be deployed to the remote client. For example, using the device management client, the administrator can control an interface via unified device management objects—in a device management interface—to deploy a unified policy (e.g., settings, configurations, updates). This mitigates the additional burden of managing devices separately.

In this way, when a local client connects to the remote client via a remote session (e.g., a virtual channel), the local client receives the unified policy that is enforced on the local client in combination with the remote client. Unified device management data associated with remote clients and the local clients can also be generated. The administrator can operate the device management client and access unified device management data including unified device management state for the remote clients and local clients. The device management interface can support different views including a unified view of the remote clients and local clients.

Advantageously, the embodiments of the present technical solution include several inventive features (e.g., operations, systems, engines, and components) associated with a device management system having a unified device management engine. The unified device management engine supports generating a unified policy object and a unified policy; deploying the unified policy to cause combined enforcement of the unified policy at a remote client and a local client; and providing unified device management operations and interfaces—via a unified device management engine that supports unified device management in a device management system. The unified device management resources are a solution to a specific problem (e.g., limitations in separately managing remote clients and local clients using conventional device management systems). The unified policy object provides a data structure for configuring policy, security, and management attributes for combined management of remote clients and local clients in a computing environment. Moreover, unified device management data is generated for a unified policy object associated with a remote client and a local client. A device management client can jointly manage—via a device management interface—the remote client and the local client based on the unified device management data.

Example Systems and Resources

Figure 1B:
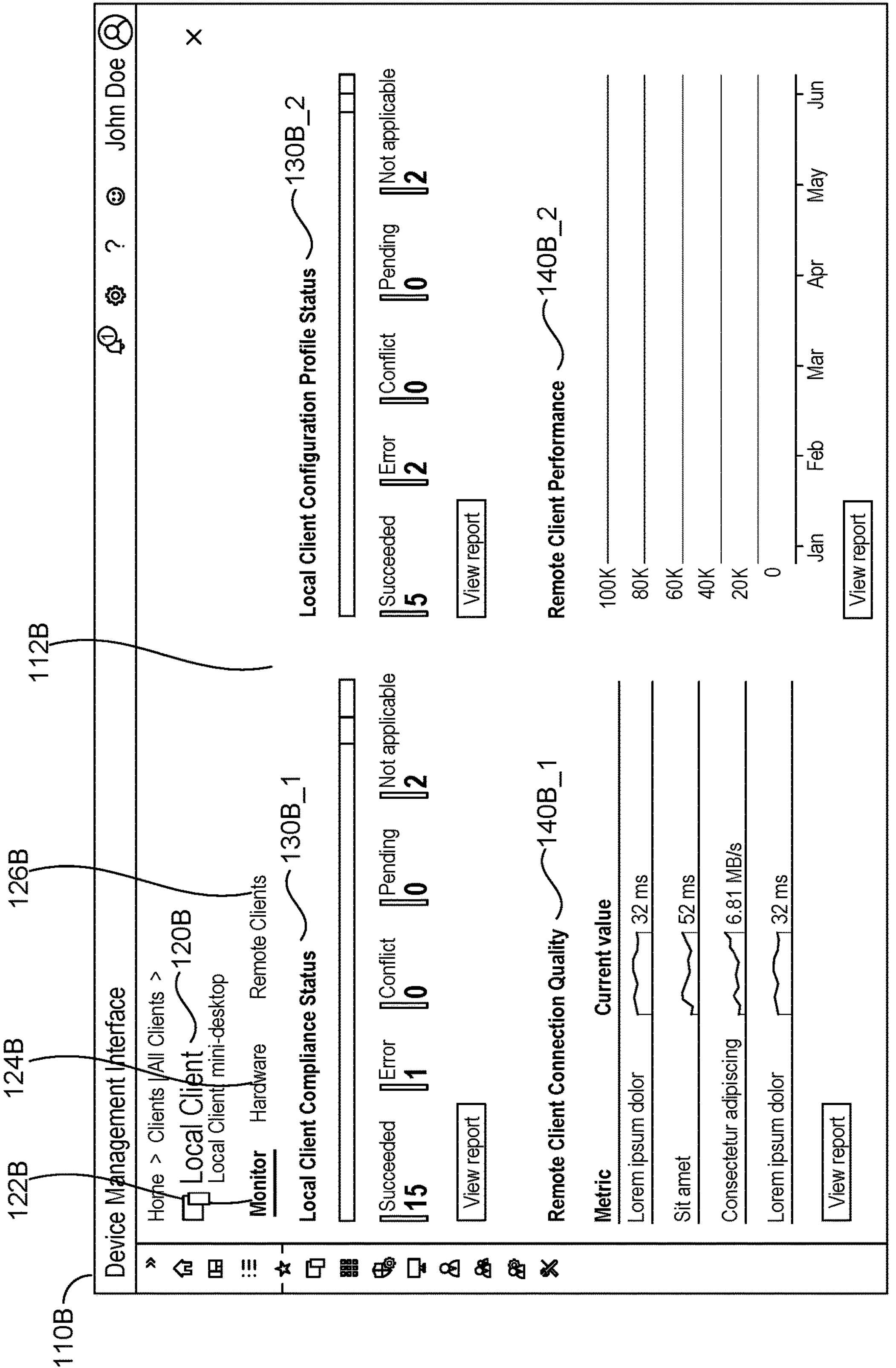
FIGS. 1B and 1C are device management interface schematics of an exemplary device management system including a unified device management engine, in accordance with aspects of the technology described herein.
Figure 1C:
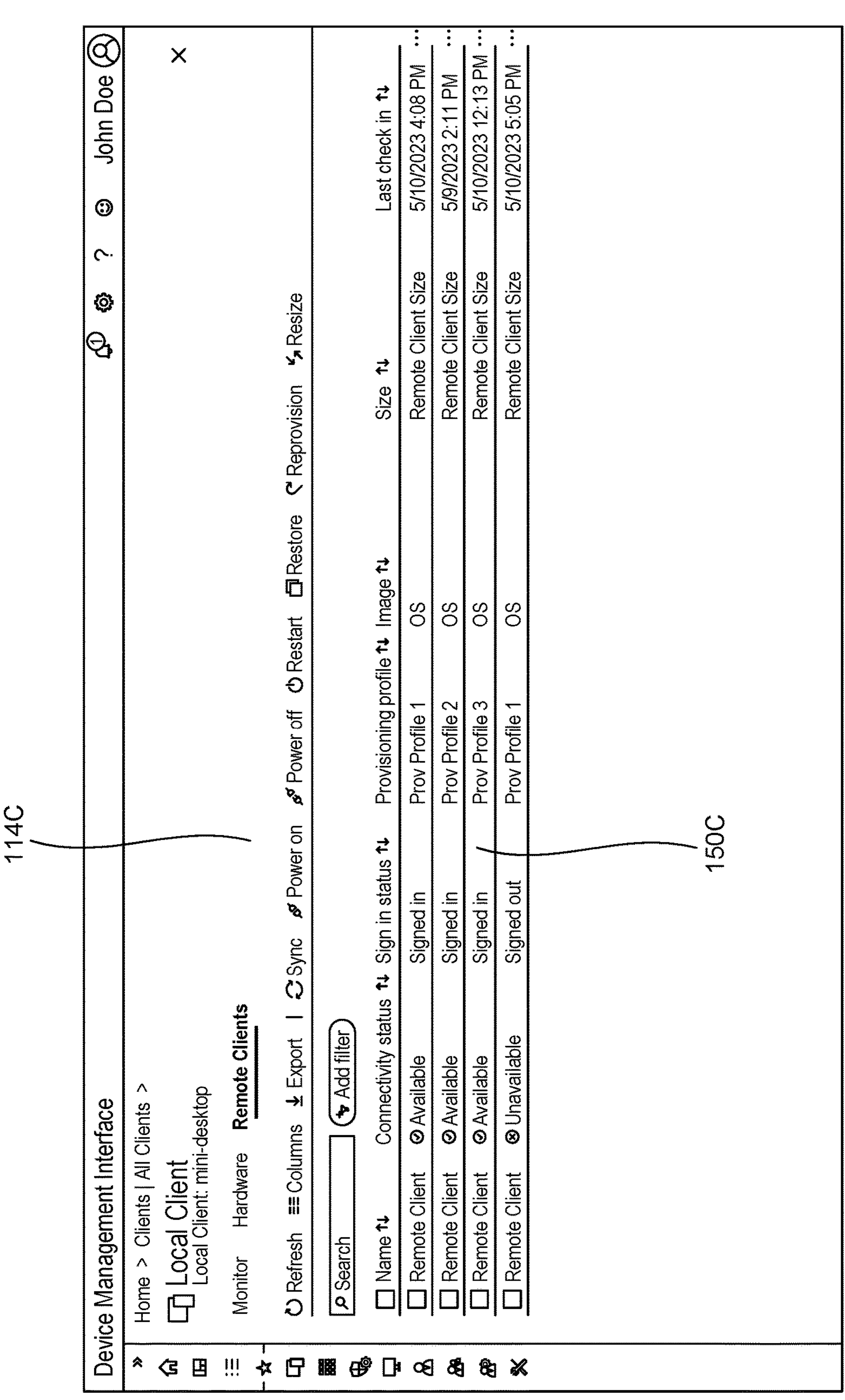

Aspects of the technical solution can be described by way of examples and with reference to FIGS. 1A-1C. FIG. 1A illustrates a cloud computing environment (system) 100, device management system 100A, device management client 100B, unified device management engine 110 having unified policy object 112, unified policy 114, unified device management resources 120 and unified device management data 130; remote client 140 with DMS agent 142, unified policy store 144, and remote desktop agent 146; local client 150 with DMS agent 152 and remote desktop client 154; and local client 160 with unmanaged local OS 162 and remote desktop client 164.

The device management system 100A provides the unified device management engine 110 that supports unified device management for remote clients and local clients (e.g., remote client 140, local client 150, and local client 160). Unified device management provides combined management of remote clients and local clients. The unified device management engine 110 supports centralized management and control of unified device management functionality. The unified device management engine 110 configures unified policy objects (e.g., unified policy object 112) for remote clients and local clients. The unified policy object 112 is a combined management configuration that enable enforcement of the unified policy 114 on both the remote clients and the local clients. The device management system 100A and the unified policy object 112 are associated with unified device management resources 120 comprising an integrated development framework of virtual desktop infrastructure resources and device management system resources. The virtual desktop infrastructure resources and device management system resources can include existing resources of the same developer. The integrated development framework enhances interoperability of functionality and features associated with a virtual desktop infrastructure and the device management system 100A.

The unified device management engine 110 receives a request from a device management client 100B to configure unified policy object 112. The unified policy object 112 can also operate as a unified device management object to support operations (e.g., configuration, provisioning, policy enforcement, monitoring and reporting) associated with unified device management. Configuring the unified policy object 112 can include configuring a unified policy 114 associated with the unified policy object 112. Configuring the unified policy object 112 can further include defining the set of rules, configurations, and parameters that govern the behavior and management of various components of corresponding devices. The unified policy object 112 can specifically identify policy attributes, security, and management features associated with a remote client only, a local client only, and/or the remote client and the local client in combination—all as part of the same unified device management state of the unified policy object 112.

The device management client 100B can also communicate a request for unified device management data 130 associated with the unified policy object 112. The unified device management data 130 can be specifically associated with unified policy 114, the remote client 140, and any local clients. The unified device management data 130 refers to a structured set of information or metadata that consolidates aspects of policy configuration, management, and enforcement for combined management of remote clients and local clients. The unified device management engine 130 generates unified device management data, and based on the device management client 100B communicating the request for the unified device management data 130, at least a portion of the unified device management data is received at the device management client 100B. The device management client 100B causes display of the unified device management data 130 on a device management interface. For example, the device management interface can provided via the device management client 100B with information associated with monitoring the devices (e.g., connectivity and performance), hardware of the local clients, and a statuses of a plurality of remote clients connected to one or more local clients.

It is contemplated that the unified policy object 112 can also indicate how to selectively enforce or apply the unified policy 114 on respective clients. By way of illustration, some policy attributes may be pertinent for physical desktops (local clients) but not for virtual desktops (remote clients). Some examples include: hardware configuration policies, which are specific to physical components such as graphics cards or peripherals, and power management policies, because physical desktops often require local power management settings that virtual desktops do not control. Physical security policies, such as those related to cable locks or biometric authentication devices, are more applicable to physical desktops due to their tangible presence and susceptibility to physical threats.

Additionally, policies concerning peripheral connectivity, such as USB device usage or Bluetooth pairing, are more relevant for physical desktops where users directly interact with peripherals. Finally, network configuration policies, particularly those concerning Wi-Fi connections, are more pertinent for physical desktops that frequently move between different Wi-Fi networks, whereas virtual desktops typically maintain consistent, wired network connections. As such, in unified policy 114, Wi-Fi, VPN, updates, lock screen wallpaper, and logon UI branding can be enabled for local clients; however, Wi-Fi is not enabled for remote clients. In this way, the unified policy can be configured such that a first policy attribute is enabled for local clients and the first policy attribute is disabled for remote clients, or vice versa.

The unified device management engine 110 communicates the unified policy 114 to the remote client 140. The remote client 140 receives the unified policy 114 from the unified device management engine 110. The DMS agent 142 can apply or enforce the unified policy 114 on the remote client 140. The unified policy 114 can be stored in the unified policy store 144. The remote desktop agent 146 supports communication between the remote client 140 and the local clients (e.g., local client 150 and local client 160), where the local clients connect to the remote client via remote desktop clients (e.g., remote desktop client 152 or remote desktop client 162). Using the remote desktop agent 142, the remote client 140 initializes a remote connection (e.g., a dynamic virtual channel) with a local client. The remote client 140 communicates the unified policy to the local client to cause the local client to apply or enforce the unified policy 114. The unified policy can be communicated to a managed device or a BYOD device can process the unified policy differently based on components on the respective devices. For example, local client 150 can employ DMS agent 152 and local client 160 can employ the remote desktop client 164 to enforce the unified policy 114.

The unified policy 114 can be used to temporarily manage a local client that is in a remote session with a remote client. Remote client 140 and local client 150 or remote client 140 and local client 160 can be configured in a primary-secondary relationship, where the remote client 140 operates as a primary device associated with a unified device management state and both local clients operate as a second device associated with the unified device management state. The unified device management state can be part of unified device management data 130. The unified device management state refers to a centralized and tracked state or condition of a set of managed devices (e.g., a remote client and a local client in a primary-secondary relationship). The unified device management state can represent the collective status of a combination of clients including device configurations, security settings, compliance status, software versions, and operational health. Achieving a unified device management state involves implementing policies, procedures, and technologies to ensure that all managed devices adhere to organizational standards, policies, and requirements.

With reference to FIG. 1B, FIG. 1B illustrates a schematic associated with a device management interface 100B. The device management interface is accessible via a device management client (e.g., device management client 100B of FIG. 1A). The device management interface 100 supports viewing remote clients and local clients ("clients") together. The device management interface 100B provides a unified view of unified management data of remote clients and local clients. A remote client and a local client can be associated with a single unified policy object. The unified policy object in device management system can be mapped to a unified policy such that the unified policy is pushed or deployed to the remote client and then the local client, upon establishing a connection with the remote client.

The device management interface 110B can include links to specific views (e.g., monitor view link 122B, hardware view link 124B, and remote clients view link 126B). As shown in the currently selected monitor view 112B, unified device management data associated with local client 120B is presented. Unified management data (e.g., local client data 130B_1 and local client data 130B_2, and remote client data 140B_1 and remote client data 140B_2) is displayed in the monitor view 112B. The device management interface 110B includes the remote clients view link 126B as an option to view exclusively remote clients. Upon selecting the remote clients view link 126B, the device management interface 110B navigates to the remote clients view 114C in FIG. 1C that includes a unified device management data portion 150C for the remote clients. The unified device management data portion 150C can include unified device management data (e.g., connectivity, provision profile, last check in date) associated with remote clients.

Figure 2A:
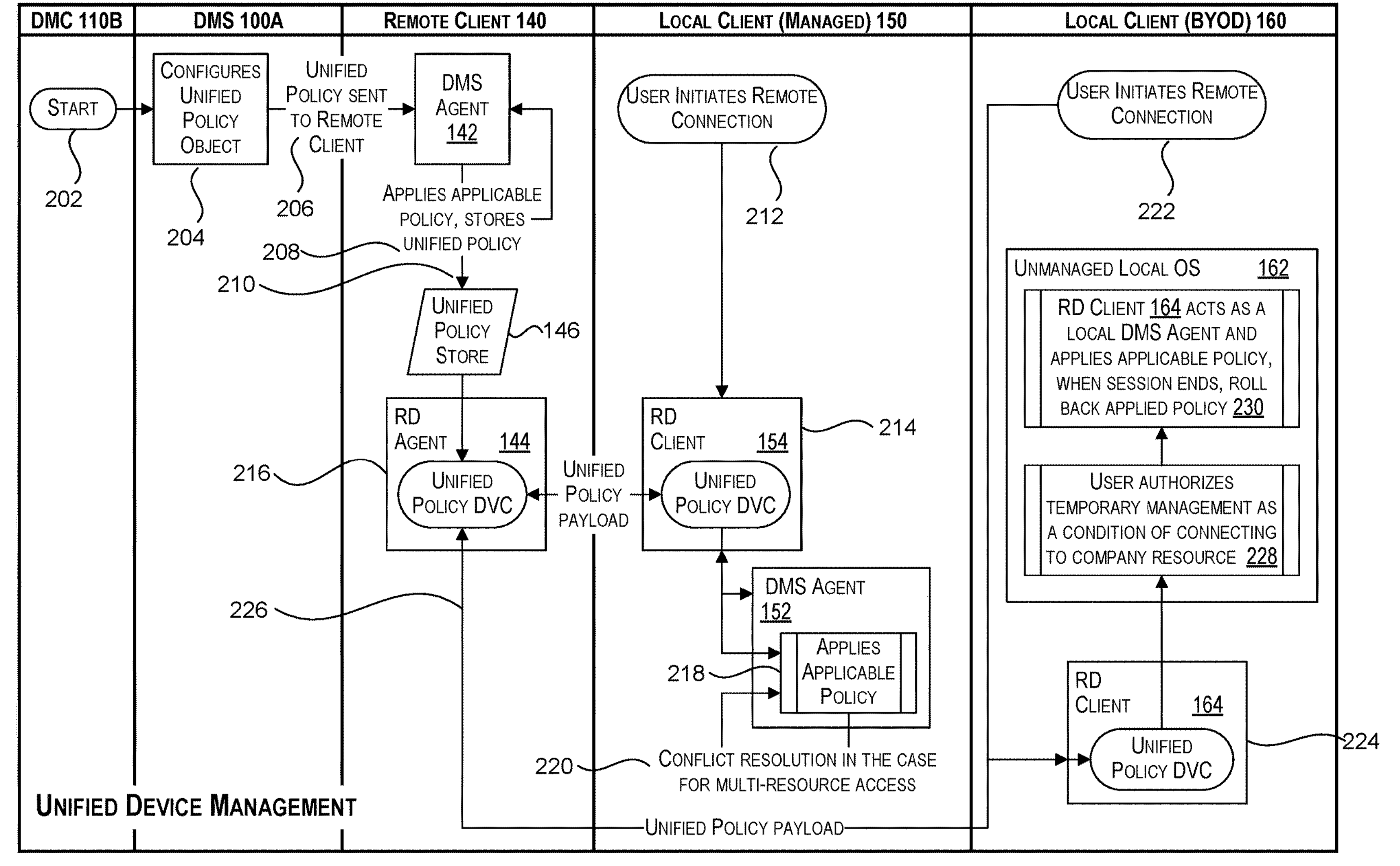
FIGS. 2A and 2B are flow diagrams associated with an exemplary device management system including a unified device management engine, in accordance with aspects of the technology described herein.

With reference to FIG. 2A, FIG. 2A illustrates cloud computing environment 100 including device management client (DMC 100B), device management system (DMS 100A), remote client 140, local client 150, and local client 160 that support providing unified device management.

By way of illustration, an administrator of the DMS 100A can configure a unified policy object and unified policy in the DMS 100—via DMC 100B. The DMS 100 assigns the unified policy to remote client 140. For example, the administrator can create the unified policy object and assign the unified policy object to a device group of remote clients in a directory service. A DMS agent on the remote client 140 can poll the DMS 100 to download a unified policy of the unified policy object.

The DMS agent can evaluate the unified policy and apply policy attributes for the remote client 140 from the unified policy, and then store the unified policy in a unified policy store. The unified policy, when applied, can effectively make the remote client a Secured Access Workstation (SAW) or a Privileged Access Workstation (PAW)—meaning the workstations are secure. SAW and PAW type workstations are typically used by users with elevated privileges, such as system administrators, IT managers, or security personnel, who require access to critical systems and sensitive data to perform their duties.

When a remote user connects to the remote client 140 via a remote session, a virtual channel (e.g., a dynamic virtual channel "DVC") is opened between the remote client 140 and a local client of the remote user. The virtual channel sends the unified policy to the local client of the remote user. A remote session agent of the remote client communicates with a DMS agent of the local client to execute an applicability evaluation of the unified policy and apply any policy attributes that are required. The unified policy, when applied on the local client, can effectively make the local client a SAW or a PAW. The DMS agent and remote session keep track of the unified policy that is being applied via the virtual channel. On disconnect of the remote session, the remote session agent communicates to the DMS agent to unwind the unified policy on the local client, leaving the local client in its original state.

With continued reference to FIG. 2A, at step 202, the DMC 100B communicates a request to DMS 100A to configure a unified policy object. At step 204, the DMS 100A configures the unified policy object and corresponding unified policy. At step 206, the DMS 100A communicates the unified policy to the remote client 140. The unified policy can be communicated to remote client DMS agent 142. At step 208, the DMS agent 142 applies applicable policy attributes of the unified policy to the remote client 140, and at step 210 stores the unified policy in the unified policy store 146 of the remote client 140.

At step 212, a user initiates a remote connection from local client 150 with the remote client 140. At step 214, the remote desktop agent 144 and the remote desktop client 154 establish a dynamic virtual connection. At step 216, the remote desktop agent 133 communicates the unified policy as a payload to the remote desktop client 154. At step 218, DMS agent 152 of the local client 150 applies applicable policy attributes of the unified policy—and upon termination of the session, the DMS agent 152 rolls back applied policy attributes; and further, at step 220 the DMS agent 152 manages conflicts for multi-resource access.

At step 222, a user initiates a remote connection from local client 160 with the remote client 140. At step 224, the remote desktop agent 144 and the remote desktop client 164 establish a dynamic virtual connection. At step 226, the remote desktop agent 144 communicates the unified policy as a payload to the remote desktop client 164. At step 228, via unmanaged local OS 162 of the local client 160, the user authorizes temporary management based on the unified policy—as a condition of connection to the remote client 140; and at step 230, remote desktop client 164 acts as a local DMS agent and applies application policy attributes of the unified policy, and when the session ends, the remote desktop client 164 rolls back applied policy attributes.

Figure 2B:
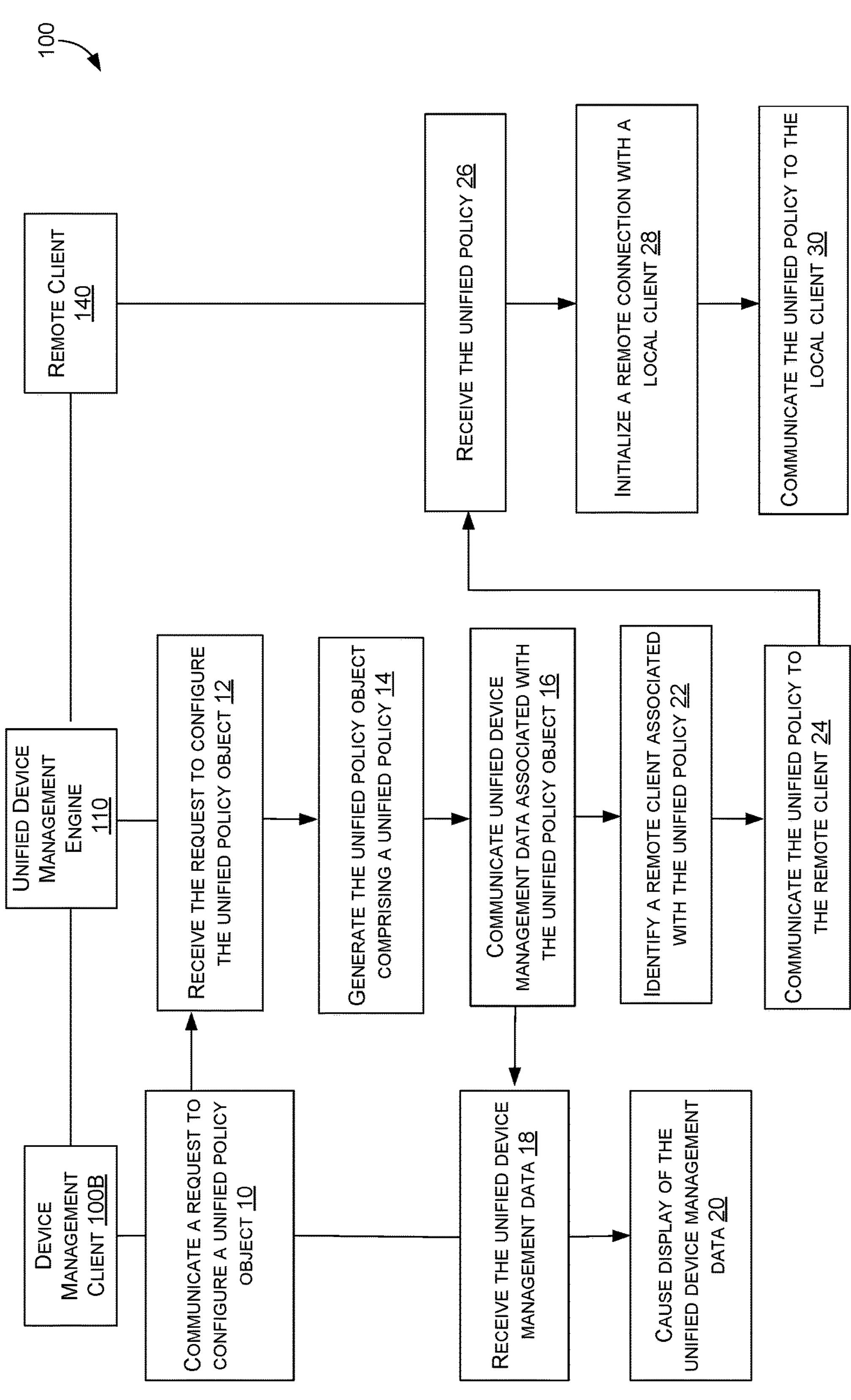

With reference to FIG. 2B, FIG. 2B illustrates a cloud computing system having device management client 100B, unified management engine 110, and remote client 140.

At block 10, the device management client 100B communicates a request to configure a unified policy object. At block 12, the unified device management engine 110 receives the request to configure the unified policy object; at block 14, generates the unified policy object comprising a unified policy; at block 16, communicates unified device management data associated with the unified policy object to the device management client 100B. At block 18, the device management client 100B, receives the unified device management data; and at block 20, causes display of the unified device management data.

At block 22, the unified device management engine 110 identifies a remote client associated with the unified policy; at block 24, communicates the unified policy to the remote client. At block 26, the remote client 140 receives the unified policy; at block 28, initializes a remote connection with a local client; at block 30 communicates the unified policy to the local client to cause enforcement of the unified policy at the local client.

Example Methods

Figure 3:
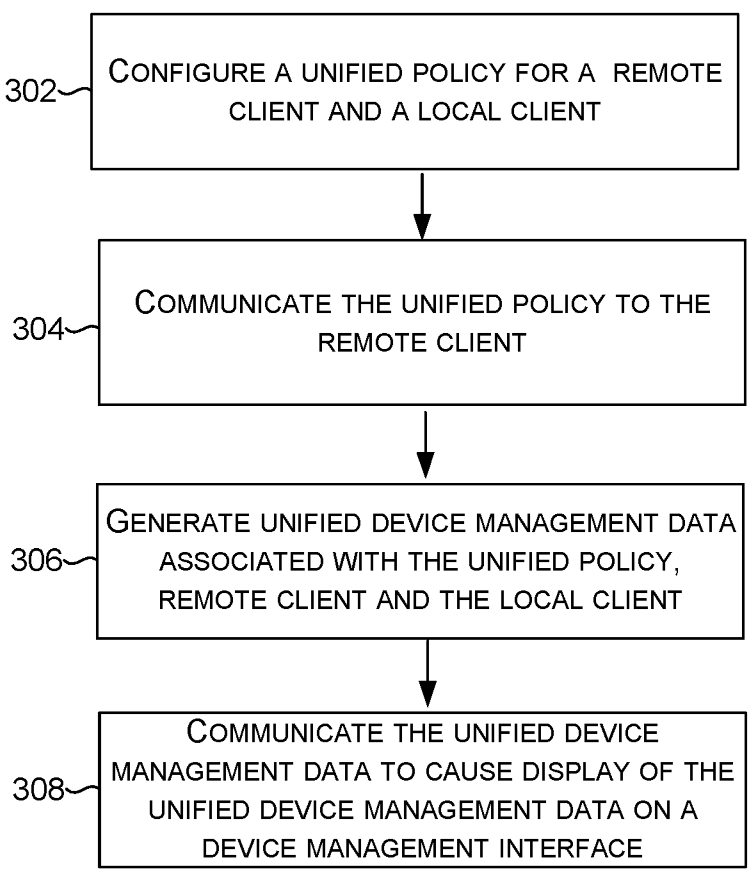
FIG. 3 provides a first exemplary method of providing unified device management using a unified device management engine, in accordance with aspects of the technology described herein.
Figure 4:
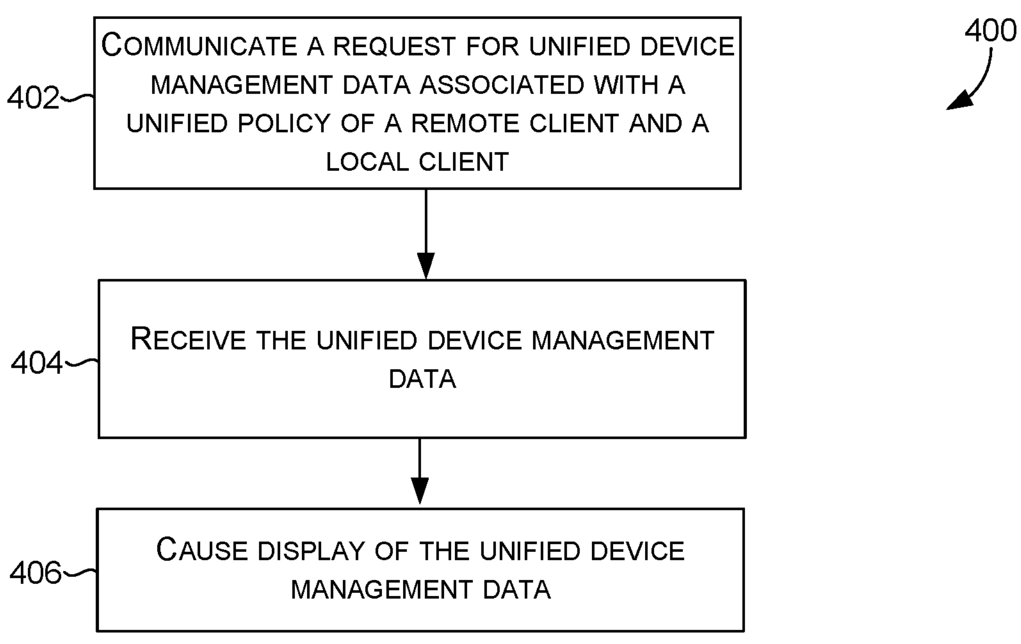
FIG. 4 provides a second exemplary method of providing unified device management using a unified device management engine, in accordance with aspects of the technology described herein.
Figure 5:
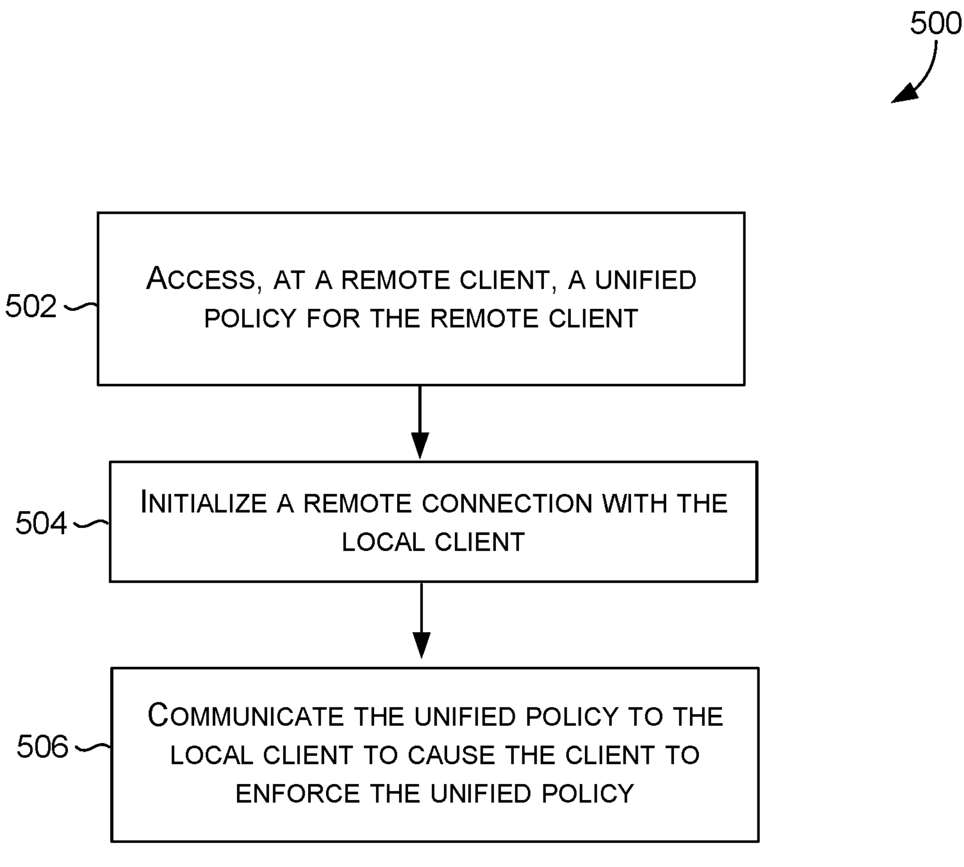
FIG. 5 provides a third exemplary method of providing unified device management using a unified device management engine, in accordance with aspects of the technology described herein.

With reference to FIGS. 3, 4, and 5, flow diagrams are provided illustrating methods for providing unified device management using a unified device management engine in a device management system. The methods may be performed using the device management system described herein. In embodiments, one or more computer-storage media having computer-executable or computer-useable instructions embodied thereon that, when executed, by one or more processors can cause the one or more processors to perform the methods (e.g., computer-implemented method) in the device management system (e.g., a computerized system).

Turning to FIG. 3, a flow diagram is provided that illustrates a method 300 for providing unified device management using a unified device management engine in a device management system. At block 302, configure a unified policy for a remote client and a local client. At block 304, communicate the unified policy to the remote client. At block 306, generate unified management data associated with the unified policy, the remote client, and the local client. At block 306, communicate the unified device management data to cause display of the unified device management data on a device management interface.

Turning to FIG. 4, a flow diagram is provided that illustrates a method 400 for providing unified device management using a unified device management engine in a device management system. At block 402, communicate a request for unified device management data associated with a unified policy of a remote client and a local client. At block 404, receive the unified device management data. At block 406, cause display of the unified device management data.

Turning to FIG. 5, a flow diagram is provided that illustrates a method 500 for providing unified device management using a unified device management engine in a device management system. At block 502, access, at a remote client, a unified policy. At block 504, initialize a remote connection with the local client. At block 506, communicate the unified policy to the local client to cause the local client to enforce the unified policy.

Technical Improvement

Embodiments of the present techniques have been described with reference to several inventive features (e.g., operations, systems, engines, and components) associated with a device management system. Inventive features described include: operations, interfaces, data structures, and arrangements of computing resources associated with providing the functionality described herein relative with reference to a unified device management engine. Functionality of the embodiments of the present invention have further been described, by way of an implementation and anecdotal examples—to demonstrate that the operations for providing the unified device management engine as a solution to a specific problem in device management technology to improve computing operations in device management systems.

By way of example, the unified device management engine supports unified device management resources that enable generating a unified policy object and a unified policy; deploying the unified policy to cause combined enforcement of the unified policy at a remote client and a local client; and providing unified device management operations and interfaces—via a unified device management engine that supports unified device management in a device management system. The unified device management resources are a solution to a specific problem (e.g., limitations in separately managing remote clients and local clients using conventional device management systems). The unified policy object provides a data structure for configuring policy, security, and management attributes for combined management of remote clients and local clients in a computing environment. Moreover, a unified device management data is generated for a unified policy object associated with a remote client and local client, a device management client can jointly manage—via a device management interface—the remote client and the local client based on the unified device management data.

Aspects of the technical solution have been described by way of examples and with reference to FIGS. 1A, 1B, 1C, 2A and 2B. FIG. 1A is a block diagram of an exemplary technical solution environment, based on example environments described with reference to FIGS. 6, 7 and 8 for use in implementing embodiments of the technical solution are shown. Generally the technical solution environment includes a technical solution system suitable for providing the example cloud computing system 100 in which methods of the present disclosure may be employed. In particular, FIG. 1A illustrates a high level architecture of the cloud computing system 100 in accordance with implementations of the present disclosure, among other engines, managers, generators, selectors, or components not shown (collectively referred to herein as "components").

Additional Support for Detailed Description

Example Device Management System in a Computing Environment

Figure 6:
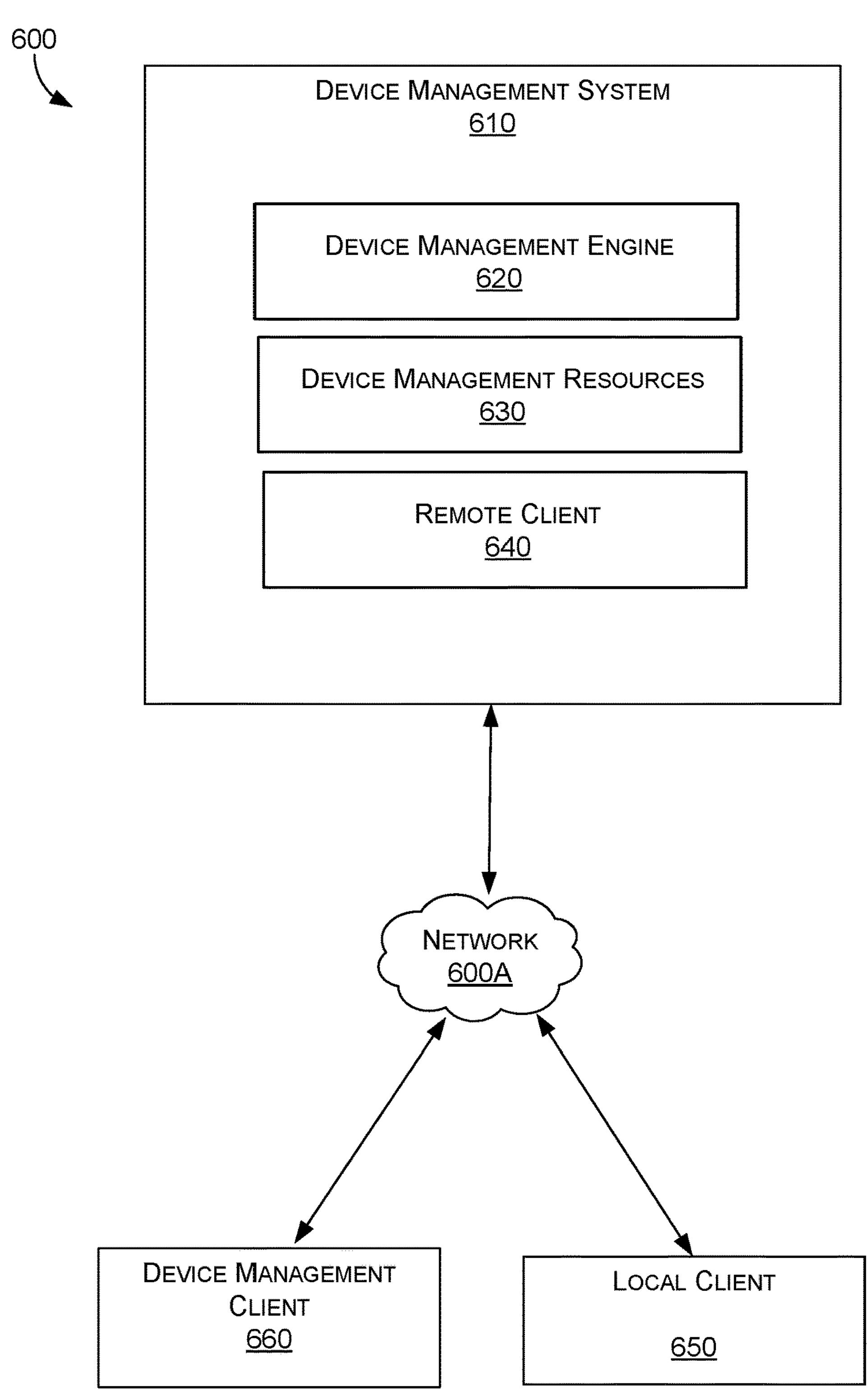
FIG. 6 provides a block diagram of an exemplary device management system suitable for use in implementing aspects of the technology described herein.

Referring now to FIG. 6, FIG. 6 illustrates a computing environment in which implementations of the present disclosure may be employed. In particular, FIG. 6 shows a high level architecture of an example cloud computing platform 600 and device management system 610 that can host a technical solution environment. It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

The cloud computing environment 100 provides computing system resources for different types of managed computing environments. For example, the cloud computing platform supports delivery of computing services-including compute, servers, storage, databases, networking, and intelligence. The components of cloud computing environment 600 may communicate with each other over a network 600A which may include, without limitation, one or more local area networks (LANs) and/or wide area networks (WANs).

The device management system 610 provides device management functionality for devices in computing environments. The device management system 610 ensures manageability, security and compliance of devices within a computing network (e.g., an organizational network), particularly in environments where Bring Your Own Device (BYOD) or corporate-owned, personally enabled (COPE) policies are in place. Device management system 610 can streamline device management processes through automated enrollment methods like over-the-air or dedicated portals, ensuring seamless onboarding onto a computing network. Administrators can remotely configure device settings for consistency and compliance, including Wi-Fi, VPN, email, and security configurations.

Device management system 610 can support a wide range of features and functionality including: application management features that allow for the distribution, updating, and licensing management of mobile apps, alongside enforcing whitelisting/blacklisting policies; security policies that encompass passcode requirements, encryption, screen lock timeouts, and remote wiping capabilities for lost or stolen devices; monitoring capabilities that provide insights into device usage, compliance, and security events, generating reports for inventory and incident tracking; and remote troubleshooting tools enable administrators to view screens, troubleshoot issues, and perform actions like device rebooting.

The device management system 610 includes a device management engine that is a computing environment that supports executing computational tasks associated with the device management system 610. The device management engine 620 can be a hardware or software component that performs computational operations, such as, mathematical calculations, data processing, and algorithm execution. The device management system 610 integrates device management resources 630 into device management system 610 to effectively provide device management in a computing environment.

The device management resources 630 refer to computing elements (e.g., components, capability, or entities) that collectively enable the device management engine 620 operations. The device management resources 630 encompass a spectrum of computing elements, beginning with the diverse operations the device management resources 630 can perform, ranging from complex computations to data manipulations. Interfaces, an integral part of the device management resources 630, provide the means for both user interaction and seamless integration with external systems, ensuring a dynamic and interactive computing experience. The data facet of the device management resources 630 involves various types: input data, which is the information provided for processing; processing data, representing the data manipulated during computational tasks; and output data, the results generated by the device management engine 620. In this way, the device management resource 112 support the broader device management engine 620 and device management system 610.

The device management resources can include unified device management resources that encompass the core operations, interfaces, and data components within device management system 110, collectively supporting its functionality in overseeing diverse devices across the cloud computing system 100. Operations within the unified device management engine 110 include device provisioning, configuration management, monitoring, troubleshooting, and security enforcement, ensuring seamless device operation and optimization throughout their lifecycle. Interfaces, including graphical user interfaces, command-line interfaces, web-based portals, APIs, and integration points, facilitate interaction with administrators, end-users, devices, and other cloud computing systems. Data components consist of device inventories, configuration profiles, policies, security settings, device status, event logs, and historical data, empowering administrators with insights into device behavior, compliance tracking, and efficient issue resolution. The unified device management resources 120 encompass enable the device management system 120 to centralize and automate the management of various devices, promoting optimal performance, compliance, and security in the cloud computing system 100.

The device management system 610 provisions remote clients (e.g., remote client 640). A remote client 640 can be virtual desktop environment (e.g., Desktop as a Service—DaaS). The remote client 640 leverages virtualization, cloud computing, and network technologies to deliver scalable, secure, and cost-effective virtual desktop environments to users, enabling flexible remote access to computing resources from any location, on any device. DaaS providers provide Virtualized Desktop Infrastructures (VDI) that host virtual desktops on servers in their data centers. These virtual desktops are created using virtualization technologies such as hypervisors or containerization platforms. Each virtual desktop includes an operating system, applications, data, and user settings.

The local client 640 connects to the remote client 640. The local client 640 can be a software application or device installed or used on the end-user's local hardware, such as a desktop computer, laptop, thin client, or mobile device. This client software facilitates the remote connection to the VDI hosted by the remote client provider, allowing end-users to access their virtual desktop environments over the internet. Local client 640 can be a managed client that is centrally controlled and monitored by device management system 610. Managed clients typically have device management software installed or configured on them, allowing administrators to enforce security policies, configure settings, deploy applications, and perform remote management tasks. The local client 650 can be an unmanaged client that operates independently without being centrally controlled or monitored. These devices lack device management software or configurations, and users have full control over their settings and applications.

The device management client 660 supports access to device management system 610. Device management client 650 provides a graphical or command-line interface for users or administrators to manage devices enrolled in the device management system 610, handling tasks such as device enrollment, policy configuration, remote management, monitoring, and reporting. The device management client 650 supports centralized device management, security enforcement, and compliance within a computing environment (e.g., organization's infrastructure), empowering efficient device administration and safeguarding corporate resources.

Example Distributed Computing System Environment

Figure 7:
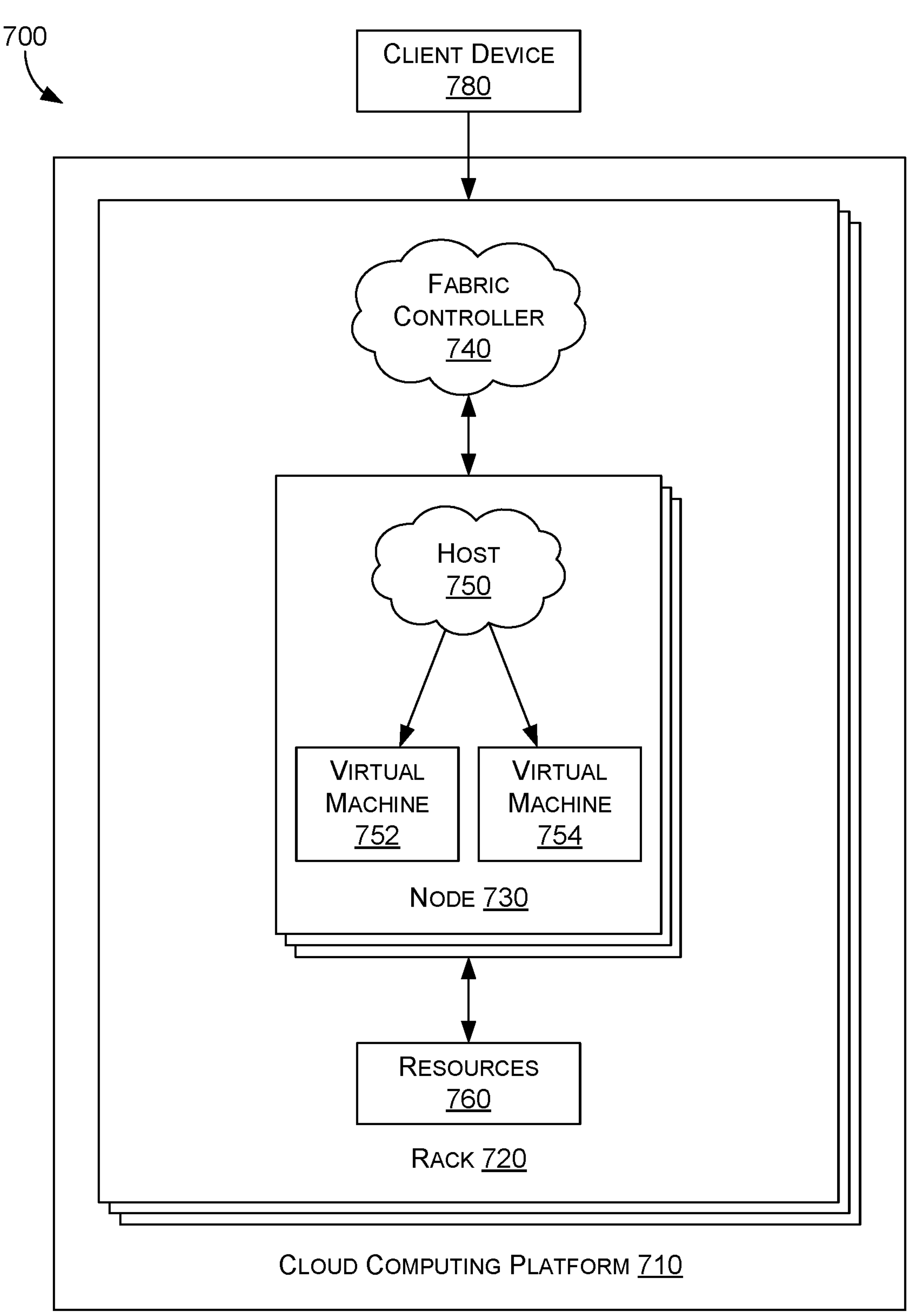
FIG. 7 provides a block diagram of an exemplary distributed computing environment suitable for use in implementing aspects of the technology described herein.

Referring now to FIG. 7, FIG. 7 illustrates an example distributed computing environment 700 in which implementations of the present disclosure may be employed. In particular, FIG. 7 shows a high level architecture of an example cloud computing platform 710 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 700 that includes cloud computing platform 710, rack 720, and node 730 (e.g., computing devices, processing units, or blades) in rack 720. The technical solution environment can be implemented with cloud computing platform 710 that runs cloud services across different data centers and geographic regions. Cloud computing platform 710 can implement fabric controller 740 component for provisioning and managing resource allocation, deployment, upgrade, and management of cloud services. Typically, cloud computing platform 710 acts to store data or run service applications in a distributed manner. Cloud computing infrastructure 710 in a data center can be configured to host and support operation of endpoints of a particular service application. Cloud computing infrastructure 710 may be a public cloud, a private cloud, or a dedicated cloud.

Node 730 can be provisioned with host 750 (e.g., operating system or runtime environment) running a defined software stack on node 730. Node 730 can also be configured to perform specialized functionality (e.g., compute nodes or storage nodes) within cloud computing platform 710. Node 730 is allocated to run one or more portions of a service application of a tenant. A tenant can refer to a customer utilizing resources of cloud computing platform 710. Service application components of cloud computing platform 710 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 730, nodes 730 may be partitioned into virtual machines (e.g., virtual machine 752 and virtual machine 754). Physical machines can also concurrently run separate service applications. The virtual machines or physical machines can be configured as individualized computing environments that are supported by resources 760 (e.g., hardware resources and software resources) in cloud computing platform 710. It is contemplated that resources can be configured for specific service applications. Further, each service application may be divided into functional portions such that each functional portion is able to run on a separate virtual machine. In cloud computing platform 710, multiple servers may be used to run service applications and perform data storage operations in a cluster. In particular, the servers may perform data operations independently but exposed as a single device referred to as a cluster. Each server in the cluster can be implemented as a node.

Client device 780 may be linked to a service application in cloud computing platform 710. Client device 780 may be any type of computing device, which may correspond to computing device 700 described with reference to FIG. 7, for example, client device 780 can be configured to issue commands to cloud computing platform 710. In embodiments, client device 780 may communicate with service applications through a virtual Internet Protocol (IP) and load balancer or other means that direct communication requests to designated endpoints in cloud computing platform 710. The components of cloud computing platform 710 may communicate with each other over a network (not shown), which may include, without limitation, one or more local area networks (LANs) and/or wide area networks (WANs).

Example Computing Environment

Figure 8:
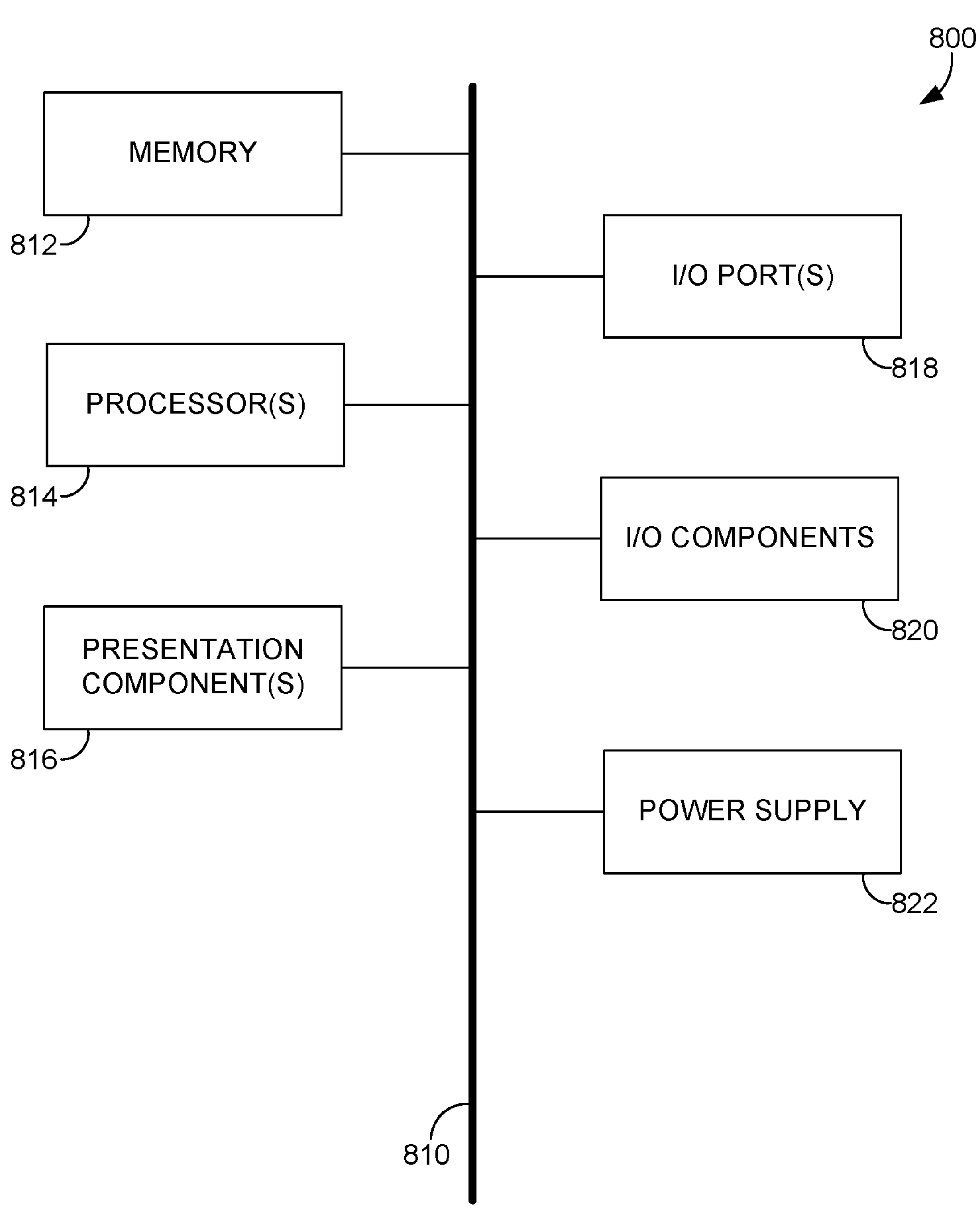
FIG. 8 is a block diagram of an exemplary computing environment suitable for use in implementing aspects of the technology described herein.

Having briefly described an overview of embodiments of the present technical solution, an example operating environment in which embodiments of the present technical solution may be implemented is described below in order to provide a general context for various aspects of the present technical solution. Referring initially to FIG. 8 in particular, an example operating environment for implementing embodiments of the present technical solution is shown and designated generally as computing device 800. Computing device 800 is but one example of a suitable computing environment and is not intended to suggest any limitation as to the scope of use or functionality of the technical solution. Neither should computing device 800 be interpreted as having any dependency or requirement relating to any one or combination of components illustrated.

The technical solution may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technical solution may be practiced in a variety of system configurations, including hand-held devices, consumer electronics, general-purpose computers, more specialty computing devices, etc. The technical solution may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more buses (such as an address bus, data bus, or combination thereof). The various blocks of FIG. 8 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 8 is merely illustrative of an example computing device that can be used in connection with one or more embodiments of the present technical solution. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technical solution is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technical solution are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present technical solution may generally refer to the technical solution environment and the schematics described herein, it is understood that the techniques described may be extended to other implementation contexts.

For purposes of this disclosure the word "support" refers to provisioning of functionality, services, or assistance by a computing component or through computing operations within a broader computing system. When a computing component or set of operations supports a specific functionality, it means that it plays a role in enabling or executing that particular aspect of the computing system. This support can manifest in various ways, including the processing of data, execution of operations, management of resources, and ensuring compatibility or interoperability with other components. Additionally, support may involve providing interfaces, APIs (Application Programming Interfaces), or protocols that allow seamless interaction and integration with other elements of the computing system. The concept of support extends beyond mere functionality provision to encompass maintenance, troubleshooting, and the overall optimization of computing resources to ensure the robust and efficient operation of the computing system.

Embodiments of the present technical solution have been described in relation to particular embodiments which are intended in all respects to be illustrative rather than restrictive. Alternative embodiments will become apparent to those of ordinary skill in the art to which the present technical solution pertains without departing from its scope.

From the foregoing, it will be seen that this technical solution is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:

one or more computer processors; and computer memory storing computer-useable instructions that, when used by the one or more computer processors, cause the one or more computer processors to perform operations, the operations comprising:

configuring a unified policy object for a remote client and a local client, wherein the unified policy object is a combined management configuration that enables enforcement of a unified policy of the unified policy object on both the remote client and the local client;

communicating the unified policy to the remote client, wherein the unified policy is temporarily enforced on the local client via the remote client during a remote session between the remote client and the local client;

generating unified device management data associated with the unified policy, the remote client, and the local client, wherein the unified device management data comprises information associated with a unified device management state for the remote client and the local client, wherein the unified device management state comprises a tracked state representing a collective status of the remote client and the local client; and communicating the unified device management data to cause display of the unified device management data on a device management interface.

2. The system of claim 1, wherein configuring the unified policy object is based on a request from a device management client to configure the unified policy, wherein configuring the unified policy object comprises generating the unified policy, and wherein the unified policy enables consolidation of policy configuration, management, and enforcement for remote clients and local clients.

3. The system of claim 1, wherein the unified policy object is associated with unified device management resources comprising an integrated development framework of virtual desktop infrastructure resources and device management system resources.

4. The system of claim 1, wherein the unified policy includes a first policy attribute that is enabled for local clients and the first policy attribute that is disabled for remote clients.

5. The system of claim 1, wherein the unified policy is temporarily enforced on the local client during a remote session between the remote client and the local client.

6. The system of claim 1, the operations further comprising:

receiving, from a device management client, a request for the unified device management data associated with the unified policy, the remote client, and the local client, wherein the device management client enables configuration and management of the unified policy object and the unified policy; and based on receiving the request, communicating the unified device management data to the device management client to cause display of the unified device management data on the device management interface, wherein the device management interface includes a plurality of unified device management interfaces configured to display unified device management data associated with remote clients and local clients.

7. The system of claim 1, the operations further comprising:

receiving, at the remote client, the unified policy;

applying the unified policy at the remote client, wherein applying the unified policy comprises selectively applying remote client policy attributes of the unified policy;

initializing a remote connection with the local client; and communicating the unified policy to the local client to cause the local client to apply the unified policy, wherein applying the unified policy comprises selectively applying local client policy attributes of the unified policy.

8. One or more computer-storage media having computer-executable instructions embodied thereon that, when executed by a computing system having a processor and memory, cause the processor to perform operations, the operations comprising:

communicating a request for unified device management data associated with a unified policy, a remote client, and a local client, wherein the unified policy is associated with a unified policy object that is a combined management configuration that enables enforcement of the unified policy of the unified policy object on the remote client and the local client, wherein the unified policy is temporarily enforced on the local client via the remote client during a remote session between the remote client and the local client;

based on communicating the request for the unified device management data, receiving the unified device management data, wherein the unified management data comprises information associated with a unified device management state for the remote client and the local client, wherein the unified device management state comprises a tracked state representing a collective status of the remote client and the local client; and causing display of the unified device management data on a device management interface.

9. The media of claim 8, the operations further comprising:

configuring the unified policy object for the remote client and the local client;

communicating the unified policy to the remote client;

generating the unified device management data associated with the unified policy, the remote client, and the local client; and communicating the unified device management data to cause display of the unified device management data on a device management interface.

10. The media of claim 9, wherein configuring the unified policy object is based on a request from a device management client to configure the unified policy, wherein configuring the unified policy object comprises generating the unified policy.

11. The media of claim 8, wherein the unified policy enables consolidation of policy configuration, management, and enforcement for remote clients and local clients.

12. The media of claim 8, wherein the unified policy object is associated with unified device management resources comprising an integrated development framework of virtual desktop infrastructure resources and device management system resources.

13. The media of claim 8, wherein the unified policy is temporarily enforced on the local client during a remote session between the remote client and the local client.

14. The media of claim 8, wherein the device management interface includes a plurality of unified device management interfaces configured to display unified device management data associated with remote clients and local clients.

15. A computer-implemented method, the method comprising:

receiving, at a remote client, a unified policy, wherein the unified policy is associated with a unified policy object that is a combined management configuration that enables enforcement of the unified policy on the remote client and a local client, wherein the unified policy is temporarily enforced on the local client via the remote client during a remote session between the remote client and the local client;

initializing a remote connection with the local client; and communicating the unified policy to the local client to cause enforcement of the unified policy on the local client, wherein the unified policy is associated with unified device management data, wherein the unified device management data comprises information associated with a unified device management state for the remote client and the local client, wherein the unified device management state comprises a tracked state representing a collective status of the remote client and the local client.

16. The method of claim 15, the method further comprising:

applying the unified policy at the remote client, wherein applying the unified policy comprises selectively applying remote client policy attributes of the unified policy.

17. The method of claim 15, the method further comprising:

storing the unified policy in a unified policy store of the remote client.

18. The method of claim 15, wherein enforcement of the unified policy on the local client comprises selectively applying local client policy attributes of the unified policy.

19. The method of claim 15, wherein the unified policy is temporarily enforced on the local client during a remote session between the remote client and the local client.

20. The method of claim 19, wherein the remote connection is associated with a dynamic virtual channel that enables communicating the unified policy from the remote client to the local client.

* * * * *